Oct. 29, 1940.   T. R. HARRISON   2,219,774
CONTROL METHOD AND APPARATUS
Filed Jan. 15, 1937   4 Sheets-Sheet 1
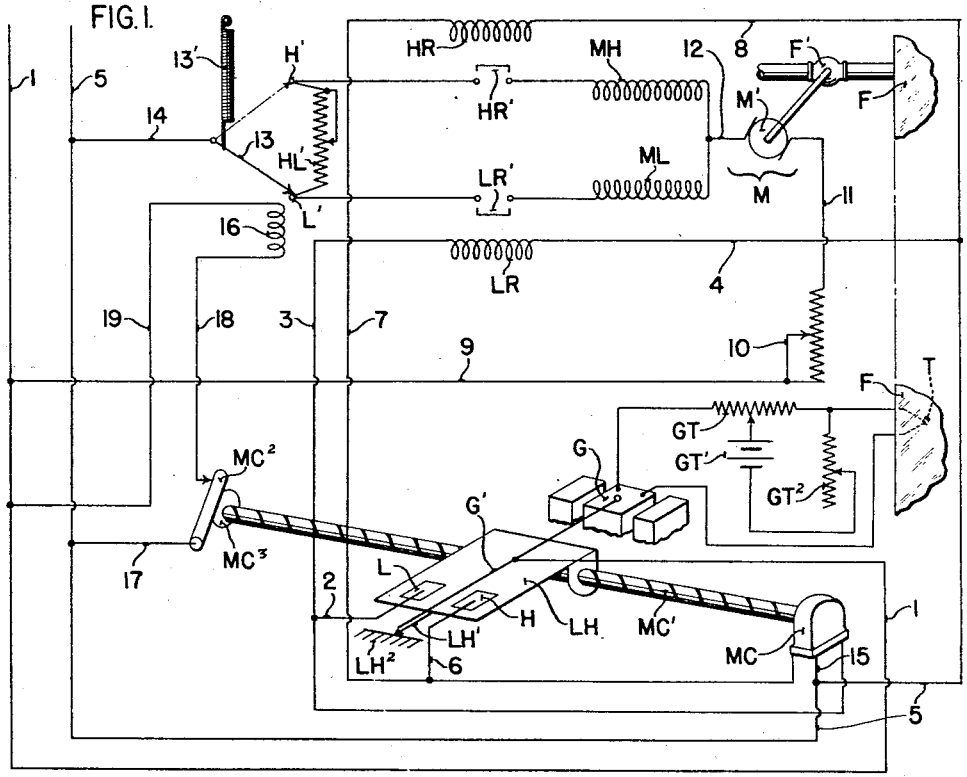
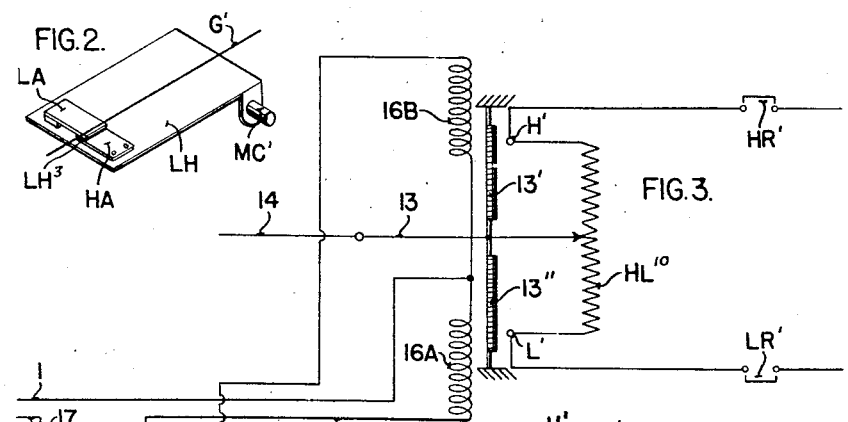
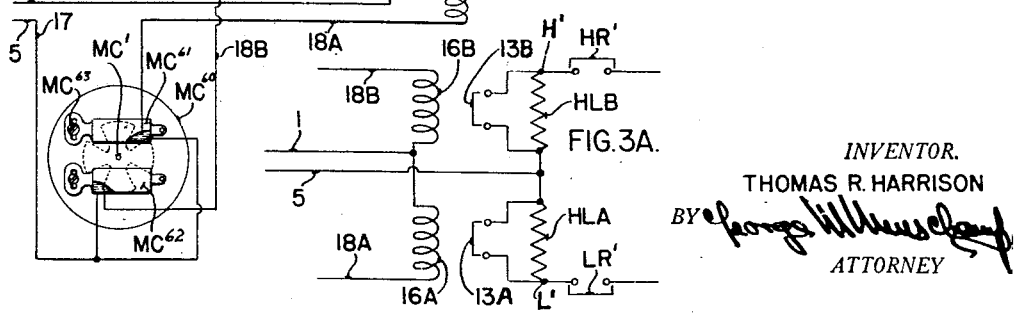
INVENTOR.
THOMAS R. HARRISON
BY *[signature]*
ATTORNEY

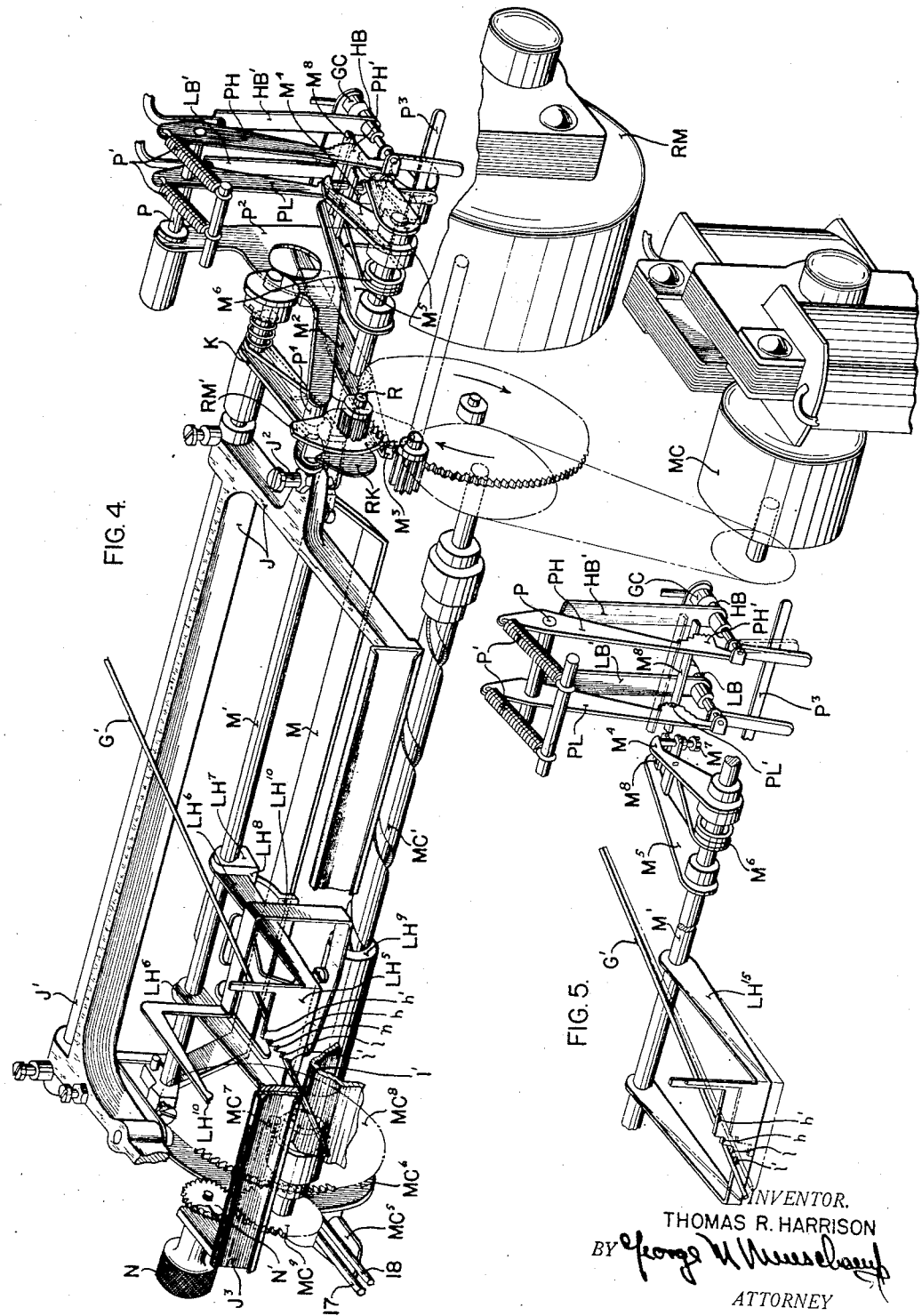

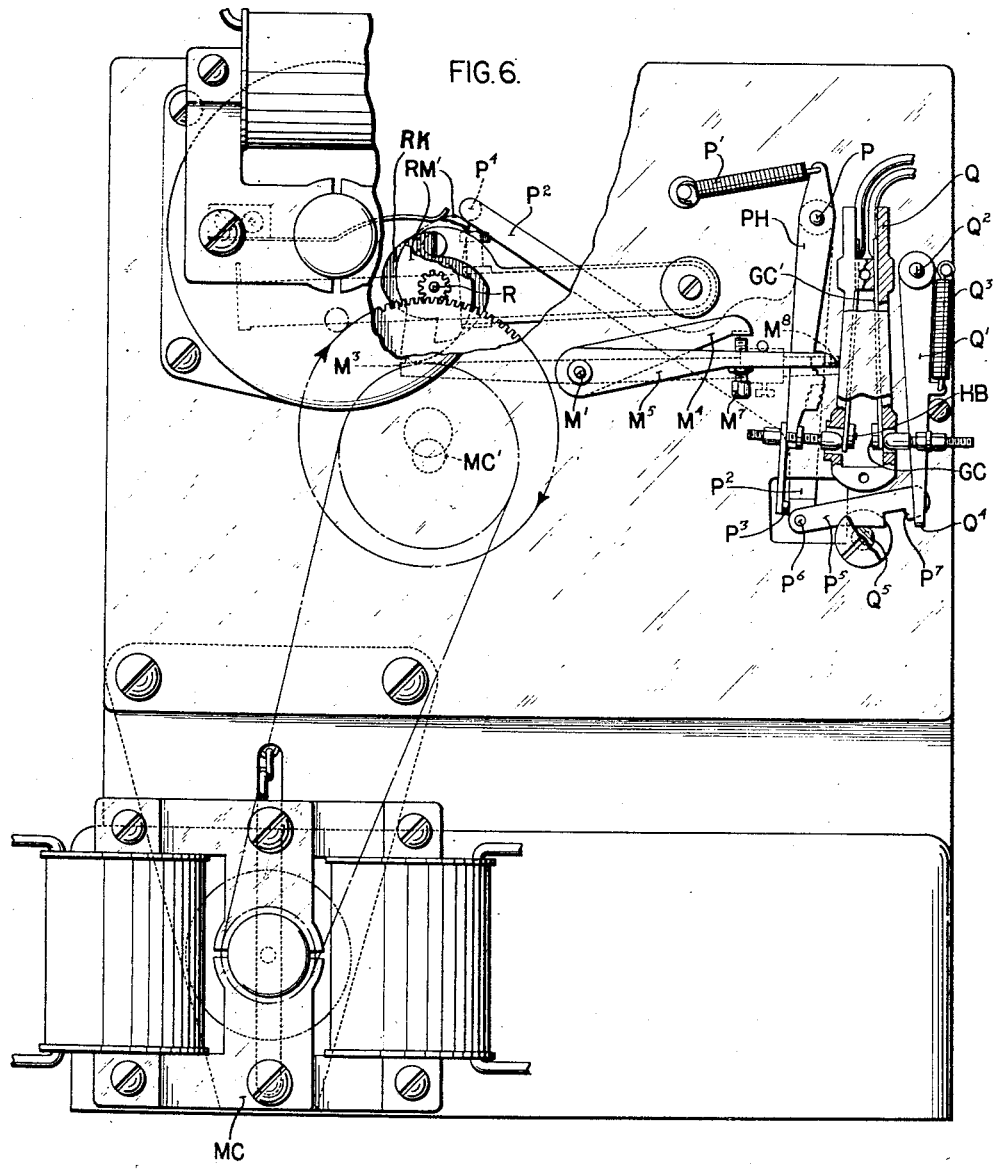

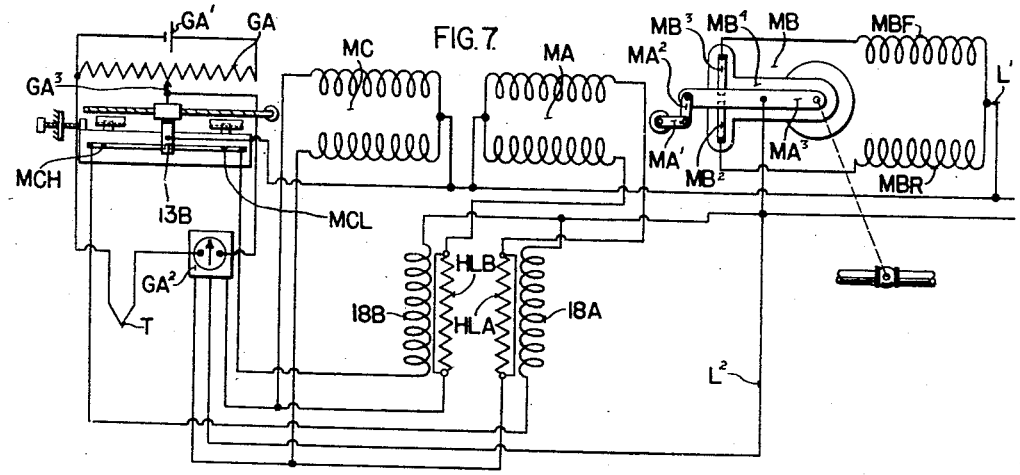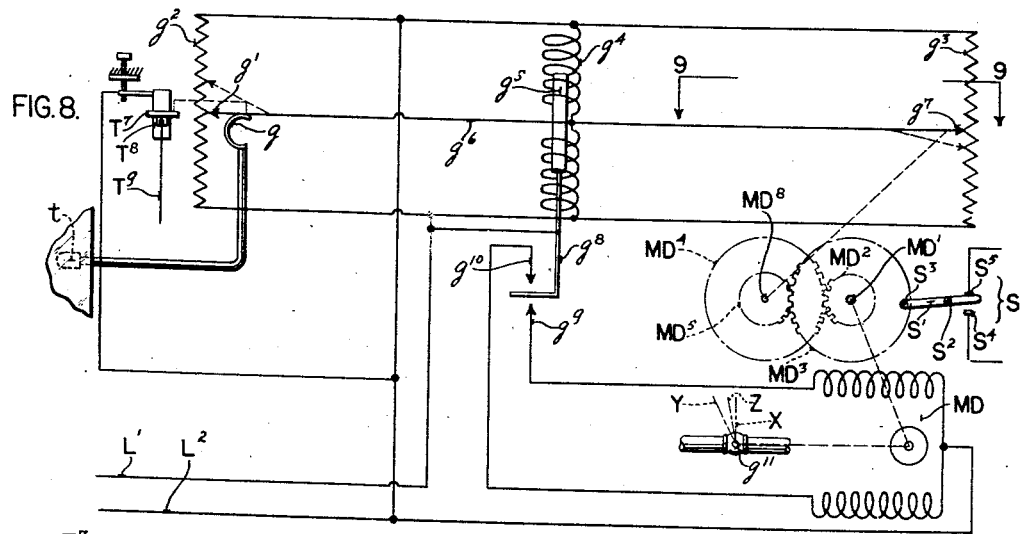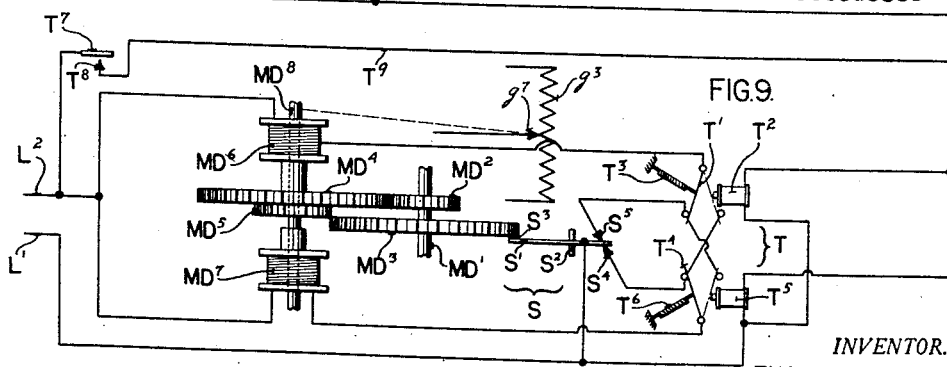

Patented Oct. 29, 1940

2,219,774

UNITED STATES PATENT OFFICE 2,219,774

CONTROL METHOD AND APPARATUS

Thomas R. Harrison, Wyncote, Pa., assignor to The Brown Instrument Company, Philadelphia, Pa., a corporation of Pennsylvania Application January 15, 1937, Serial No. 120,662

28 Claims. (Cl. 172—239)

The general object of the present invention is to provide improved control apparatus for regulating a variable, such as a temperature, pressure, flow, or the like, and particularly, to provide an improved regulator or controller of the type commonly referred to as an "anti-hunting controller" including special provisions whereby "hunting" is avoided, while permitting of a material reduction in the departure from a normal value of the controlled quantity from a predetermined normal value of that quantity which inevitably occurs, under certain operating conditions, when the regulation is effected with a simple controller not containing such special provisions.

More specifically stated, the object of the present invention is to provide an improved anti-hunting controller, including provisions for effecting adjustments, sometimes designated as follow-up and compensating adjustments, by a novel combination of instrumentalities, operating to effect those adjustments in a novel manner.

While as already indicated, and as those skilled in the art will recognize, my improved anti-hunting controller is adapted for advantageous use for a wide variety of purposes, in explaining and illustrating the nature and principles of the present invention, it is convenient to consider, by way of example, the control actions involved, and the instrumentalities which may be utilized in regulating the supply of heat to a furnace by the adjustment of a fuel supply valve, as required to prevent the temperature in the furnace from departing widely from a certain predetermined temperature. For such a furnace control, it is theoretically possible to employ a simple thermostatic device directly connected to and actuating the furnace fuel supply valve, so that the thermostat will give opening and closing adjustments to the valve as the temperature falls below and rises above its predetermined value.

In such a furnace, what may be referred to as the furnace load, or the furnace heat requirement, must ordinarily vary from time to time, as a result of external atmospheric effects, or, more usually, as a result of a change in the amount of material being heated in the furnace, or in the temperature at which said material is introduced into or withdrawn from the furnace, and the furnace load may vary at different times from other causes, as is well known to those skilled in the art. When the furnace load increases, the tendency to a drop in the control furnace temperature can be checked only by an opening adjustment of the fuel valve, and with the simple thermostatic controller mentioned above an opening adjustment of the fuel valve is not only effected by, but necessarily requires the existence of a lower furnace temperature. Conversely, on a decrease in the furnace load, the tendency to a resultant increase in the controlled furnace temperature, can be checked only by a closing adjustment of the fuel valve effected by, and required an increased furnace temperature. The simple thermostatic controller mentioned above, when adjusted to maintain a predetermined furnace temperature for some given or assumed furnace load, will necessarily operate to maintain a furnace temperature lower or higher than the predetermined temperature, when the furnace load is heavier or lighter than said given or assumed load.

The regulation, or control, effected by the above mentioned simple thermostatic controller, can be stable if, and only if, a certain significant extent of departure of the control temperature from its normal value is permitted when a change in furnace load occurs. If, when the furnace load increases or decreases, the resultant increase or decrease in the rate of fuel supply is unduly great, there will be an inevitable tendency to overregulation, with recurrent reverse changes, or "hunting," of the controlled temperature, universally recognized as highly objectionable in any usual control operation.

By adding to such an above mentioned simple thermostatic regulator, suitable provisions for effecting so called follow-up adjustments, it is possible to reduce the extent by which the controlled temperature must be decreased or increased, on an increase or decrease, respectively, in the furnace load, without sacrifice of regulation stability, or risk of "hunting." Such a follow-up adjustment action may be effected in various known ways. In general, a follow-up adjustment, involves some adjustment of the control mechanism whereby when the furnace temperature changes as a result of an increase or decrease in furnace load, the control mechanism is recalibrated, so to speak, so that with the normal furnace load the mechanism would tend temporarily, to maintain a furnace temperature respectively lower or higher than the predetermined furnace temperature. Where the control is effected by the deflection of an element deflecting in accordance with changes in the control condition, the follow-up adjustment provisions may be included either in the mechanism by which the element is deflected, or in the mechanism cooperating with the deflecting element to produce the corrective control effects.

The follow-up adjustment action, no matter how effected, serves to increase the rapidity or extent, or both the rapidity and extent, with which the control action effected on the departure of the control quantity from its normal value, is neutralized, when the control quantity is subsequently being returned to its normal value, and it is because of this augmented neutralization action, that the use of follow-up adjustment provisions permit the extent of corrective change in the rate of fuel supply, to be increased without giving rise to regulation unstability or hunting.

While the use of follow-up provisions, minimizes the extent of departure of the control temperature from its normal value which must be permitted to insure stable regulation with changes in furnace load, it does not prevent the action of the regulator including such provisions from being like that of the simple regulator, in that it necessarily maintains a control temperature higher or lower than the normal temperature, when the furnace load is lighter or heavier than the normal load at which the controller is operative to maintain the controlled temperature at approximately its normal value.

By providing the regulator with suitable provisions for effecting what is sometimes designated as compensating or reset adjustments, it is possible, however, to maintain stable regulation, while making it possible for the controller to maintain an approximately constant predetermined temperature, with furnace loads greater or less than the normal load at which the controller would maintain the predetermined temperature if the controller did not include compensating or reset adjustment provisions. The compensating or reset adjustment effect can be secured in various known ways. In general, it involves an adjustment whereby when the normal temperature exists, the fuel valve will be open more or less widely with a heavier or lighter furnace load, respectively, than with an intermediate load.

As those skilled in the art will understand, in practice, and for the purposes for which an anti-hunting controller is suitable and practically useful, the controller cannot be as simple as the thermostatic controller mentioned above. On the contrary, in ordinary practice, such a controller must comprise a sensitive element deflecting in accordance with the controlling condition, such as a galvanometer connected to a thermo-couple responsive to the furnace temperature in furnace temperature control, and in practice such a sensitive deflecting element must be associated with and control a relay device such as an electric motor, by which the fuel valve or analogous control device is adjusted. In general, the controlling provisions associated with the deflecting element must comprise a control table, or some equivalent device.

For example, in one embodiment of the present invention illustrated and hereinafter described, the control instrument includes a galvanometer or analogous sensitive deflecting element, and a control table which in one form, supports contacts engaged by the galvanometer pointer, and in another form, supports means for gaging the deflective position of the galvanometer pointer or other sensitive deflecting device, and for correspondingly actuating contacts which control the operation of a reversible electric motor which adjusts the fuel valve or analogous adjusting device. Each of said embodiments also includes a reversible electric follow-up motor effecting follow-up adjustments by adjusting the control table so that the latter moves along the path of deflection of the sensitive element in the same direction as the deflecting element when the latter deflects in either direction away from or toward its normal position. In accordance with the present invention, the control and follow-up motors are simultaneously energized for operation in the respective directions required to increase the fuel supply, and to move the control table toward the low end of its range of movement, when the furnace temperature diminishes, and for operation in their respective opposite directions when the temperature increases, and in accordance with the present invention, the compensating or reset adjustment action is secured, by increasing or decreasing the operating effect of the control motor relative to the operating effect of the follow-up motor, accordingly as the deflection of the sensitive deflecting element is respectively away from, or toward the normal value position of that element. In the preferred embodiments of the invention illustrated and described herein, the speed and extent of movement of the follow-up motor is the same for a given extent of deflection of the sensitive element, whether the deflection is toward or away from the normal value position of the element, but the speed and extent of movement of the control motor, resulting from the same deflection, is greater when the deflection is away from, than when it is toward the normal value position of the deflecting element.

I, and others, have previously devised and proposed various anti-hunting controller arrangements including provisions for effecting follow-up and compensating adjustments, but all such prior arrangements adapted or intended for use in electrically operative controllers, have been too complicated and expensive to permit of their general commercial use, and the present invention was primarily devised, and is adapted, to avoid those practical objections to the use of follow-up and compensating adjustments in electrical controllers.

The various features of novelty which characterize the present invention are pointed out with particularity in the claims annexed to, and forming a part of this specification, but for a better understanding of the invention, its advantages, and specific objects attained with its use, reference should be had to the accompanying drawings and descriptive matter in which I have illustrated and described preferred embodiments of the invention.

Of the drawings,

Fig. 1 is a diagrammatic illustration of one embodiment of my invention;

Fig. 2 is a perspective view illustrating a modification of a portion of the apparatus shown in Fig. 1;

Fig. 3 is a diagrammatic illustration of another modification of the apparatus shown in Fig. 1;

Fig. 3A is a diagram illustrating another modification;

Fig. 4 is a perspective view of a portion of apparatus which may be used in and for the purposes diagrammatically illustrated in Fig. 1;

Fig. 5 is another perspective view of a portion of the apparatus illustrated in Fig. 4;

Fig. 6 is a fragmentary elevation of a portion of the apparatus illustrated in Fig. 4;

Fig. 7 is a diagrammatic illustration of another form of my invention; and

Figs. 8 and 9 are diagrammatic views showing still another form of my invention.

Fig. 1 is a diagrammatic representation of control apparatus for adjusting the fuel supply valve F', of a furnace F, as required for the control of the furnace temperature to which the thermo-couple T is responsive. As shown in Fig. 1, that furnace temperature is measured by a galvanometer G included in a measuring circuit of the deflectionary potentiometric type, and comprising a resistance GT in series with the galvanometer and thermocouple T, and an energization shunt about a variable portion of the reistance GT. Said shunt, as shown, comprises a battery or other E. M. F. source GT', and an adjustable resistance GT². With such a potentiometer measuring circuit, the voltage effect on the galvanometer of the battery GT', with a suitable battery voltage and adjustment of the connections of the battery to the resistance GT and GT², will be exactly neutralized by the thermocouple voltage at the predetermined normal furnace temperature. At that temperature, the galvanometer G' will occupy a neutral position, from which it will deflect to the left as seen in Fig. 1, when the furnace temperature falls below its normal or predetermined value, and from which it will deflect to the right when the furnace temperature rises above its normal value.

As shown in Fig. 1, the fuel valve F' is directly adjusted by the operation in one direction or the other of a reversible electric control motor M which is controlled for operation in one direction or the other by the engagement of the galvanometer pointer G' with one or the other of contacts L and H carried by a control table LH. The latter is in threaded engagement with a helically grooved or threaded shaft MC'. The latter is adapted to be rotated by a reversible electric follow-up motor MC, so as to thereby effect follow-up adjustments by giving the control table movements toward and away from a neutral or normal position of the latter, corresponding and proportional to the deflective movements of the galvanometer pointer toward and away from the neutral or normal position of the latter. Ordinarily in such apparatus as is illustrated diagrammatically in Fig. 1, the galvanometer pointer, regardless of its deflective position, does not engage either contact L or H, except periodically when the pointer and control table are given a movement of approach transverse to the plane of deflection, by some depressor mechanism, not illustrated in Fig. 1, but various forms of which are well known and widely used.

To avoid confusion or misapprehension, it is noted at this point, that in the apparatus shown in Figs. 4, 5, and 6, the galvanometer pointer does not directly engage control contacts, but is periodically engaged by a gaging device, which adjusts independently supported contact elements to produce the circuit controlling effects, produced in Fig. 1, by the direct engagement of the galvanometer pointer with contacts L and H. It is practically possible, however, to produce the contemplated circuit controlling effects, by the engagement of the galvanometer pointer with contacts mounted on the control table, generally, as indicated in Fig. 1, or by other well-known means.

As illustrated in Fig. 1, the motor M is set into operation to give an opening adjustment to the valve F', by the energization of the motor field winding ML, and is set into operation to give a closing adjustment to said valve by the energization of a second field winding MH. The energization of the field winding ML is directly controlled by an electro-magnetic switch including an energizing coil LR and a normally open switch contact member LR', which is closed when the coil LR is energized. When the galvanometer pointer G' engages the contact L, the coil LR is energized through a circuit including the supply conductor 1, galvanometer pointer G', contact L, conductors 2, and 3, coil LR, and a conductor 4 connected to the second supply conductor 5. The energization of the field winding MH is directly controlled by a second electromagnetic switch, including an energizing coil HR and a switch contact device HR', the latter being moved to its closed position by the energization of the coil HR. The latter is energized by the supply conductors 1 and 5, when the galvanometer pointer G' engages the contact H, through a circuit including the galvanometer pointer G' connected to the supply conductor 1, the contact H, conductor 6, conductor 7, coil HR, and a conductor 8 which is connected to the supply conductor 5.

When the pointer G' engages contact L and energizes coil LR, the field winding ML is energized through a circuit including the supply conductor 1, conductor 9, an adjustable resistance 10, conductor 11, armature M' of the motor M, conductor 12, field winding ML, contact device LR', and a switch member 13 connected by a conductor 14 to the supply conductor 5 when in its full line position shown in Fig. 1. For compensating adjustment purposes hereinafter explained, the switch member 13 is in direct engagement with a contact or terminal L' directly connected to switch contact device LR', and when the switch member 13 is in its dotted line position, it directly engages a contact H' which is connected to the contact or terminal L' by a resistance HL'.

When the galvanometer pointer G' engages the contact H, and thereby energizes the coil HR the field winding MH is energized by the supply conductors 1 and 5, through a circuit including the previously mentioned conductor 9, resistance 10, conductor 11, motor armature M' and conductor 12, the field winding MH, switch contact device HR', contact H', switch member 13, which may then directly engage L, or be connected thereto through contact H' and resistance HL', and the conductor 14 connecting the switch member 13 to the supply conductor 5.

The follow-up motor MC may be identical in form and in the arrangement of its armature and two field windings (not shown) with the motor M, but no resistance is associated with the field windings of the motor MC, as the resistance HL' is associated with the field windings of the motor M, and hence no electro-magnetic switches corresponding to those including the parts LR, LR', HR and HR' are associated with the energizing circuits for the motor MC. When the galvanometer pointer G' engages the contact L, the motor MC is energized for operation in the direction to adjust the control table to the left, or toward the low end of its range of adjustment, by a circuit including branch 15 from the supply conductor 5, a portion of the conductor 3 in series with the corresponding field winding (not shown) of the motor MC, conductor 2, contact L, pointer G' and its connection to the supply conductor 1. When the pointer G' is in engagement with the contact H, the motor MC is energized for operation to adjust the table to the right or toward the high end of its range of movement, by a circuit including the branch conductor 15 from the supply conductor 5, the second field winding (not shown) of the motor MC, a portion of the conductor 7, conductor 6, contact H, and pointer G' connected to the supply conductor 1.

As will be apparent from the explanations previously made, and as would be recognized by those skilled in the art if these explanations had not been made, the apparatus shown in Fig. 1 would operate just as does any ordinary electric controller having follow-up provisions, if the resistance HL' were replaced by a conductor without significant resistance so as to make it immaterial whether the switch member 13 occupied its full or its dotted line position. With the furnace load at a normal value for which the control apparatus were properly calibrated, the galvanometer pointer and the control table would then tend to occupy their normal value or neutral position, in which the galvanometer pointer would be between the contacts L and H. In such case, on any temporary change in operating conditions such as the opening of the furnace door or the movement into or out of the furnace of material heated, resulting in a change in furnace temperature, the pointer G' would deflect and energize the control motor M to increase or decrease the fuel supply, and thereafter the motor would be given a reverse operation to restore the normal setting or adjustment of the valve F' as the pointer G' returned to normal. Each such movement or operation of the motor M would be attended by a corresponding and proportional operation of the motor MC, giving follow-up adjustments to the table LH away from and back to its normal position, as the galvanometer pointer deflected away from and back to its normal position. On any significant and non-ephemeral increase or decrease in the furnace load, the galvanometer pointer G' would tend to occupy a definite position corresponding to the new furnace load, at one side or the other of its normal position, and if the new load condition continued for any considerable period, the control apparatus would stabilize itself, with the pointer G' in the position last mentioned, and with a corresponding adjustment position of the fuel valve F', and a corresponding follow-up adjustment position of the control table LH.

The tendency of the control apparatus to maintain the galvanometer pointer in the position last referred to, on a significant and non-ephemeral change in the furnace load, is avoided by the compensating or reset adjustment action obtained in the apparatus shown in Fig. 1, by use of the resistance HL' and the switch member 13. As shown in Fig. 1, the switch member 13 is biased for movement into its dotted line position in which it engages the contact or terminal H', by a spring 13', but is moved into and held in its full line position in which it engages the terminal L', by the energization of a relay switch coil 16. The latter is energized or deenergized on movement of the control table LH to the low or high side, respectively, of its normal position, by means of a cam MC³ carried by the shaft MC' and a switch MC² adjusted by the cam MC³. When the table LH is at the low side of its neutral position, the cam MC³ holds the switch MC² in a closed position in which the coil 16 is energized by a circuit including a conductor 17 connecting the switch member MC² to supply conductor 5, a conductor 18 then engaged by the switch member MC², the coil 16 and a conductor 19, connecting one end of the coil 16 to the supply conductor 1. When the table LH is at the right or high side of its neutral position, the cam MC³ moves, or permits movements, of the switch member MC², out of engagement with the conductor 18, thereby deenergizing coil 16, whereupon the spring 13' moves the switch member 13 into its dotted line position.

For the purposes of the present invention, it is unimportant whether the switch member MC² be in or out of engagement with the conductor 18 when the table LH is in its normal position, since the compensating or follow-up action is not of a significant importance in the operation of the controller in response to temporary, minor departures of the controlled temperature from its normal value, such as may result from slight, ephemeral and easily corrected for changes in furnace load. On significant changes in furnace load, however, continuing for any appreciable time interval, the compensating adjustment action resulting in the operation of the apparatus shown in Fig. 1, from the inclusion therein of the resistance HL' and switch 13 is important and highly desirable.

When, as a result of a significant load change, there is an appreciable displacement of the galvanometer pointer G' and control table LH each to one side, for example the low side, of its respective normal position, the ratio of the respective adjustment effects of the motors M and MC² will not be modified by the compensating provisions, since the switch 13 will then be in its full line position, and the energizing circuit for the field winding ML of the motor M will not include the resistance HL'. The resultant initial adjustment of the fuel valve F', or some repetition thereof, will sooner or later cause the galvanometer pointer G' to deflect toward its normal position. This brings the resistance HL' into use since it is in series with the field winding MH of the motor M then energized. The resistance HL' by reducing the current flow through the field winding MH, reduces the speed of the motor M in the direction to give a closing adjustment to the valve L'. The extent of movement of the control motor M during each motor operation period will thus be smaller for a given deflection of the pointer G' toward its neutral position, than for a preceding deflection of the pointer away from the neutral pointer position.

The slowing down and reduction in extent of movement of the motor M as the galvanometer pointer returns to neutral, is not attended by a corresponding slowing down, or change in extent of movement of the follow-up motor MC. In consequence, when the control table LH and the galvanometer pointer are returned to their respective neutral or normal positions, the fuel valve F' will not have the same adjustment which it had when the control temperature began to fall from its normal value, but will be more widely open, so that the normal furnace temperature can be maintained, or approximated, notwithstanding the continuing existence of the furnace load increase which resulted in the initial decrease in furnace temperature. Operations the converse of those described, occur when a decrease in furnace load results in a rise in the controlled furnace temperature. When the furnace load decreases, the resultant control actions by which the control table and the galvanometer pointer are returned to their normal positions after being first displaced to the high sides of said positions, leave the fuel valve F' less widely open than it was before the decrease in load occurred.

On each adjustment, the movements of the control table and of the fuel valve are proportional to the deflection of the galvanometer, but the proportion is constant in the case of the galvanometer deflection and control table movements, whereas the proportion or ratio of extent of adjustment of the fuel valve F" to extent of galvanometer deflection, is greater when the galvanometer deflection is away from its neutral position than when it is toward its initial position. Since the control table movements follow, and are in constant proportion to the deflective movements of the galvanometer pointer, an index LH' carried by the control table LH, in conjunction with a stationary scale LH² may be employed to indicate the current value of the furnace temperature.

In the apparatus shown diagrammatically in Fig. 1, the control table contacts L and H are laterally displaced so that the galvanometer pointer G' and control table have normal positions which are neutral positions in which the pointer can engage neither of the contacts. Such apparatus may be so proportioned that when the pointer is returned to its neutral position, following its deflection from that position on a change of load, and the resultant corrective adjustments of the fuel valve, the fuel valve position will be just that required to carry the new load, provided, there is a suitable proportionality between the load change and resultant deflection of the pointer G'. With some controlled processes, however, such proportionality may not continuously prevail, and in such case, the apparatus as shown in Fig. 1, may come into a condition of stable balance, or "hang up," with the pointer G' displaced from its normal position, undesirably but not sufficiently, for operative engagement with either of the contacts L and H. The possibility of having the control system so hang up, may be avoided by arranging the apparatus so that the galvanometer pointer and control table will have no operatively neutral relative position, and one arrangement for accomplishing this is illustrated in Fig. 2.

In Fig. 2, the control table LH may be exactly like the control table LH of Fig. 1, but the contacts LA and HA mounted thereon, differ from the contacts L and H of Fig. 1, in their relative arrangement. While the contact HA may be identical in form and disposition with the contact H of Fig. 1, the contact LA is arranged to overlap the contact HA, though held out of contact with the latter at all times by interposed insulation LH³. In consequence, when the galvanometer pointer G' of Fig. 2 is depressed, relative to the control table, it must operatively engage one or the other of the contacts LA and HA. With the modification illustrated in Fig. 2, the control table LH can have no neutral zone position, and when conditions are such as to maintain the pointer G' in its normal position, the motors M and MC will be operated alternately in opposite directions, and effect correspondingly alternate adjustments in opposite directions of the fuel valve and the control table. The elimination of the neutral zone or relative position of the pointer and control table, may be obtained in other ways, one of which is illustrated in Fig. 5, hereinafter described.

The operative results of the apparatus illustrated diagrammatically in Figs. 1 and 2, are obtainable with apparatus shown in Figs. 4, 5, and 6 in which use is made of control instrument features of known type, disclosed in the prior patents of Brown, No. 1,826,986, and Krogh No. 2,000,235, comprising a control table of the galvanometer pointer position gaging type. The control table LH⁵ shown in Fig. 4, is periodically turned about a shaft M' into and out of engagement with the pointer G'. The shaft M' is parallel to the shaft MC', and the latter is rotated by the motor MC to move the table longitudinally of the shafts M' and MC' for follow-up adjustment purposes as in the arrangement of Fig. 1. The angular position of the table LH⁵ when in engagement with the pointer G', depends upon whether the latter then engages one or another of table shoulders l', l, n, h, h', arranged in a series distributed both parallel to and transversely of the plane of pointer deflection. The angular position of the table LH⁵, when in engagement with the pointer G controls the operation of a mechanical relay mechanism selectively closing the energizing circuits for the motor MC, and for a control motor not shown in Figs. 4, 5, 6, but which may be exactly like the motor M of Fig. 1.

With apparatus including the instrument mechanism parts shown in Figs. 4, 5, and 6, the circuit arrangements associated with the follow-up control motor, may be, and as contemplated are, of the precise character illustrated in Fig. 1, but the circuit controlling actions of the table carried contacts L and H, and galvanometer pointer G' of Fig. 1, are performed in the apparatus shown in Figs. 4, 5, and 6 by the relay actuated contacts LB, HB, and GC, respectively, as is hereinafter explained.

As is hereinafter further explained, the control table LH¹⁵ shown in Fig. 5 differs from the table LH⁵, to the end of avoiding a neutral relative position of the pointer and control table, and thus insuring an operation of each motor on every periodical movement of the control table into engagement with the pointer. The arrangements of Figs. 4, 5, and 6 also provide for a graduated control, not attainable with the apparatus shown in Figs. 1 and 2. This graduated control results from the fact that when the pointer is engaged by one or the other of the shoulders l' and h', the corresponding operation of each of the control and follow-up motors is continued, as is hereinafter explained, for a longer period, and result in a greater control effect than when the pointer is engaged by either of the shoulders l or h.

As shown, the table LH⁵ comprises arms LH⁶ loosely journalled on the shaft M' between ears LH⁷, slidingly mounted on the shaft M', and in which the latter is free to rotate. The ears are carried by an extension LH⁸ from a threaded hub or nut portion LH⁹, forming a part of the control table assemblage, which surrounds, and is in threaded engagement with the shaft MC'.

Preparatory to each tilting movement of the table LH⁵ into engagement with the pointer G', the latter is clamped against an abutment portion I' of the instrument framework by a depressor J, journalled on a stationary shaft J'. The depressor J is tilted to clamp and release the pointer G', by a lever K journalled on the shaft J' and engaging an adjustable abutment screw J² carried by the depressor J. The lever K is given oscillatory movements by a cam RK secured to a shaft R continuously rotated through suitable speed reduction gearing, by the constantly rotating timing motor RM of the instrument. As shown, the cam RK has two cams lobes, so that the depressor J is given two pointer clamping oscillations on each rotation of the shaft R.

Following each operation of the depressor J to clamp the pointer G' against the abutment I', the table LH⁵ is tilted into position in which one of its previously mentioned shoulders l', l, etc., engages the pointer G', and thereby arrests the tilting up movement of the table LH⁵. The table LH⁵ has a gravitational bias to turn down and away from the pointer G', and is given its turning movements in the opposite direction by corresponding turning movements of yoke member M secured to the shaft M' and having a gravitational bias for turning movements in the clockwise direction as seen in Fig. 4. On each such turning movement, the member M engages a tailpiece LH¹⁰ of the control table, and thereby gives the latter its up movement into engagement with the pointer G', which terminates the movement. The gravitational bias of the member M is due in part to a counterweighted lever M² secured to the shaft M' and carrying a projection M³. The latter normally engages a second cam RM' carried by the constantly rotating shaft R, which normally prevents the shaft M' and member M from turning under their gravitational bias. Twice in each revolution of the shaft R, and in suitably timed relation with the movement of the depressor J effected by the cam RK, the cam RM' permits the member M to turn under its gravitational bias until the pointer G' is engaged by the table LH⁵.

The angular position of the shaft M' when its gravitational tilting movement is arrested by the engagement of the table LH⁵ with the pointer G', controls the operation of the previously mentioned circuit controlling mechanical relay mechanism. That mechanism comprises an arm M⁴ secured to the shaft M' and a selector element M⁵, journalled on the shaft M', but tending to turn with the member M⁴ as a result of a resilient connection M⁶ between M⁴ and M⁵, which tends to hold an abutment screw M⁷ carried by the part M⁵ in engagement with a lateral extension of the arm M⁴, thereby fixing the normal relation of the arm M⁴ and selector M⁵, said relation being adjustable by rotation of the screw M⁷.

The position assumed by the selector M⁵ on each engagement of the table LH⁵ with the pointer G', is thus dependent jointly upon the deflection of the latter and upon the position of the table longitudinally of the shaft MC'. The selector M⁵ forms the controlling element of the previously mentioned mechanical relay mechanism, which is actuated when the member M⁵ is in the position assumed when the pointer G' is engaged by one of the table shoulders l' or l, to effect engagement of the contacts LB and GC for a longer or shorter period of time, and is actuated when the position of the member M⁵ is that assumed when the pointer G' is engaged by one or the other of the shoulders h' or h to effect engagement of the contacts HB and GC for a longer or shorter period respectively. When the position assumed by the member M⁵ is that corresponding to the engagement of the pointer G' by the table shoulder n, the relay mechanism is prevented from effecting engagement of either of the contacts LB and HB with the contact GC.

The mechanical relay mechanism comprises two side by side contact actuating levers PL and PH journalled on a shaft P parallel to the shaft M', and each lever is biased for counter-clockwise movement, as seen in Figs. 4, 5, and 6, by a corresponding spring P'. Except during a certain portion of each operating cycle, the levers PL and PH are held in a retracted position by a finger or bar-like part P³ parallel to the shaft P and carried by a cam lever P² journalled on the shaft P and having a projection P⁴ riding on the cam RM'. The latter is so formed, relative to the disposition of the cam lever, that following the engagement of the pointer G' by one or another of the control table shoulders and before the member M begins its reverse movement permitting the table shoulder to move out of engagement with the pointer, the retractive action on the levers PL and PH of the finger P³ is temporarily suspended. The levers PL and PH then turn under the action of their respective bias springs P' until their movements are arrested by the engagement of the cam portions PL' and PH' of the two levers with the edge of a finger bar part M⁸ of the member M⁵, said edge being parallel to the shaft P.

The angular position of each of the levers PL and PH, when its movement is arrested by engagement with the finger M⁸, depends upon the angular position of the part M⁵, which determines the particular points of the lever cam portion PL' and PH' then engaging the finger M⁸. The cam portion PH' is so shaped that when the position of the member M⁵ is that resulting from the engagement of the point by either of the shoulder l, l', or n, the lever PH will not operatively engage the contact HB, which is then held in an inoperative position by a spring arm HB'. The latter is supported at its end remote from the contact HB by a switch housing Q. When the position of the member M⁵ corresponds to the engagement of pointer G' by the table shoulder h or h', the lever PH is permitted to move far enough under the action of its bias spring to engage the contact HB and advance it, respectively, to one operative position, or into a second and more advanced operative position. The contact LB is arranged alongside the contact HB, and is supported by a spring arm LB', similar in form, and in its mounting in the switch housing Q to the contact arm HB'. With the member M⁵ in the position corresponding to the engagement of the pointer G' by the shoulders n, h, and h', the lever arm PL will be held by the finger M³ out of operative engagement with the contact LB. When the position of the member M⁵ corresponds to the engagement of the pointer G' by the shoulder l or l', the lever PL is permitted to move forward and adjust the contact LB into a first or second operative position, corresponding to the above mentioned first and second operative positions of the contact HB.

The edges of the cam portions PL' and PH' are roughened, so that each cam portion when in engagement with the finger M⁸, holds the member M⁵ from moving out of its position on the movement of the member M, including its arm M⁴, which permits the control table to move out of engagement with the pointer, G', the spring connection M⁶ then yielding to permit relative movement of the arm M⁴ and member M⁵.

The common contact GC is carried by a spring arm GC' mounted in the switch housing Q and is normally held by the spring arm in such position that it is not engaged by either contacts LB and HB when the latter is advanced into either of its said two operative positions. Following the movement of either of the last mentioned contacts into either of its two operative positions, it is subsequently engaged by the contact GC as a result of movement given the latter by a switch actuating lever Q'. The latter is pivoted at Q², and is normally held in the inoperative position shown in Fig.

6, by a bias spring Q³. During each operative cycle, the arm Q' is turned clockwise out of the position shown in Fig. 6, by a draghook P⁵, pivotally connected at P⁶ to the cam lever P². When the latter is oscillated to permit the advancement of the levers PL and PH by their respective bias springs P', the hook lever P⁵ is moved to the right as seen in Fig. 6, far enough to permit a transverse lower end portion Q⁴ of the lever Q' to enter the hook notch P⁷ of the hook lever. When, thereafter, the lever P² moves the hook lever P⁵ to the left, as seen in Fig. 6, the arm Q' is given a clockwise movement, and the contact GC is thereby moved into engagement with whichever of the contacts, LB and HB may then be in one of its operative positions. If one of those contacts is in its second operative position, it will be engaged by the contact GC sooner, and the resultant energization period for the follow-up and control motors will be longer and the control effects produced greater, than if it is in its first operative position. In either case, the engagement of the contact GC with either of the contacts LB or HB will terminate at the same point in the operation cycle, as a result of the camming action of a stationary pin Q⁵, on the hook member P⁵. The latter has a cam edge bearing on the pin Q⁵, so shaped that the hook lever P⁵ is turned counter-clockwise, as seen in Fig. 6, about its pivot P⁶, to release the arm Q' after a predetermined extent of clockwise movement of the latter. The further clockwise movement of the cam lever P², following the release of the arm Q', acts through the finger P³ to positively return both of the levers PL and PH to their retracted positions, thereby releasing the member M⁵. The latter then turns during the final portion of the operating cycle under the action of the spring M⁶ required to bring the abutment screw M⁷ into engagement with the arm M⁴.

The control table LH⁵ of Fig. 4, carries an index LH¹⁰ which may cooperate with a scale carried by the front portion J³ of the depressor J, to indicate the different values of the controlling condition resulting in the adjustment of the control table LH⁵ to different positions longitudinally of the shaft MC'. As shown in Fig. 4, a knob N, connected to shaft MC' by gears N' and MC⁹, is provided for manual rotative adjustment of the shaft MC' as required to set the control table LH⁵ in any desired position whenever desirable as at the beginning of an operating period. The shaft MC' of Fig. 4, may control the connection between the circuit conductors 17 and 18 through a cam MC³ and switch MC² as in Fig. 1. As shown, however, in lieu of said cam and switch member, use is made in Fig. 4 of a mercury switch MC⁵, carried by a disc MC⁶. The latter is not carried by the shaft MC', but is separately journalled at MC⁷, and is connected to the shaft MC' by speed reducing gear including a gear MC⁸ and a gear MC⁹ carried by the shaft MC', to avoid an objectionably large angular movement of the disc MC⁶ as the control table LH⁵ is moved from one end to the other of the shaft MC'. As the control table is moved to the low or high side of its intermediate position, the mercury switch M⁵ is tilted to connect or disconnect the conductors 17 and 18.

Preferably, the angular relation between the disc MC⁶ and shaft MC' is made adjustable, as by means including a friction or slip connection between the gear MC⁸ and the shaft MC'. Such adjustability permits of a ready adjustment in the position of the control table LH⁵, from which movement of the table in one direction or the other will tilt the mercury switch to connect or disconnect the conductors 17 and 18. As will be apparent, the same operative adjustment may be obtained with the apparatus shown in Fig. 1, by providing for the angular adjustment of the cam member MC³ relative to the shaft MC'.

The arrangement shown in Fig. 5 differs from that shown in Fig. 4 only in that the control table LH¹⁵ of Fig. 5 omits the neutral shoulder n of the control table LH⁵ of Fig. 4. The omission of the neutral control table n serves the purpose obtained with the arrangement of the contacts LA and HA on the control table of Fig. 2, of avoiding a neutral relative position of the galvanometer pointer and control table. When the galvanometer pointer is maintained in its normal position, the control table will be shifted so as to effect engagements of the pointer by the table shoulders h and l in regular alternation.

As will be apparent, various modifications of the control apparatus previously described may be made, and one such modification is shown in Fig. 3, wherein, a switch arm 13 like that shown in Fig. 1, is biased for movement into an intermediate position by the opposing actions of springs 13' and 13'', and in its intermediate position, engages the midpoint of a resistance HL¹⁰, connected between the terminals L' and H' and replacing the resistance HL' of Fig. 1. From its intermediate position, the contact arm 13 is adjusted into one or the other of end positions, corresponding to the full and dotted line positions of the switch arm 13 shown in Fig. 1, accordingly as one or the other of two solenoids 16A and 16B are energized. One or the other of the two solenoids 16A and 16B is energized accordingly as the value of the controlling condition falls below or rises above a neutral range, which may be made as narrow or wide as desired, by the use or adjustment of a suitable switch mechanism, actuated by the rotation of the shaft MC'. When the contact arm 13 of Fig. 3 is adjusted into one or the other of its end positions, all of the resistance HL¹⁰ will be operatively connected in series with one or the other of the control motor field windings with which the switch devices HR' and LR' are respectively associated. In the neutral or intermediate position of the contact arm 13, half of the resistance HL¹⁰ will be connected in series with each of said field windings.

As will be apparent, the selective energization of the solenoids 16A and 16B in accordance with the angular position of the shaft MC, may be effected in various ways, and in particular by the use of a single three position mercury switch of known type suitably connected to the shaft MC'. Preferably, however, and as shown in Fig. 3, use is made of two mercury two position switches MC⁶¹ and MC⁶². The latter as shown in Fig. 3, are carried by a disc MC⁶⁰ which may be mounted and connected to the shaft MC exactly as is the disc MC⁶ of Fig. 4. The switch MC⁶¹ in its closed position energizes the coil 16A by connecting conductor 18A to the conductor 17 and thence to the supply conductor 5, the conductor 18A being connected to one terminal of the coil 16A, while the other terminal of the coil 16A, as well as one terminal of the coil 16B is directly connected to the supply conductor 1. The energization of the coil 16B is effected by the adjustment of switch MC⁶² into its closed position, in which it connects the conductor 17 to a conductor 18B running to the second terminal of the coil 16B. The switches MC⁶¹ and MC⁶² are advantageously each adjustably mounted on the disc MC⁶⁰, as by means of an adjustable clamping connection MC⁶³ between a holder for each of the switches and the disc MC⁶⁰.

As will be apparent, by adjusting the switches MC⁶¹ and MC⁶² relative to the disc MC⁶⁰, the extent of angular movement of the disc MC⁶⁰ which may occur without energization of either of the solenoid coils 16A and 16B, may be widely varied, thus giving the control table a corresponding wide and variable neutral range or zone. As will be apparent, the arrangement shown in Fig. 3, is usable alike in control apparatus including a control table of the type of the control table LH of Fig. 1, or of the type of the control table LH⁵ of Fig. 4.

For the general purpose of such an arrangement as is shown in Fig. 3, it is not essential that the control motor field windings terminal H' and L' be connected to the supply conductor 5 through the switch arm or contact 13. On the contrary, those terminals may each be permanently connected to the supply conductor 5, as in the arrangement shown by way of example in Fig 3A, wherein the terminals L' and H' are permanently connected to the supply conductor 5 through resistance HLA and HLB, respectively. In Fig. 3A solenoid coils 16A and 16B actuate switch contactors 13A and 13B respectively, biased for movement into positions in which they respectively short-circuit the resistance HLA and HLB.

The terminal conductors 18A and 18B of Fig. 3A, may be connected to switches MC⁶¹ and MC⁶² carried by a disc MC⁶⁰ associated with the shaft MC', as in the arrangement shown in Fig. 3. In the arrangement shown in Fig. 3A, however, each of the switches MC⁶¹ and MC⁶² should be so positioned by the disc MC⁶⁰ and the latter should be so adjusted relative to the shaft MC' that in a neutral zone position of the control table, each of the switches will be in its open position, and so that the switch MC⁶¹ will be closed only when the control table moves to the high side of its neutral zone, while the switch MC⁶² will be closed only when the control table moves to the low side of its neutral zone. With the last mentioned movement of the control table the resultant energization of the coil 16B will cut the resistance HLB into circuit. In consequence, when the controlling condition is increasing, but is so low that the control table is at the low side of its neutral zone, the control motor movement will be slowed down relative to its movement when the value of the controlling condition is in the same range but is increasing. The ratio of the movements of the control motor on decreases and increases, respectively, in the value of the controlling condition, when the latter is so high that the control table is at the high side of its neutral zone, will be correspondingly varied by the energization of the coil 16A, bringing the resistance HLA into operation.

As those skilled in the art will understand, whether it is desirable that the control table should have a neutral zone as it does with the arrangements shown in Figs. 1 and 4, or shall have no neutral zone as is the case with the arrangements of Figs. 2 and 5, and if when it has a neutral zone, provisions such as those shown in Fig. 3 for varying the extent of that zone through a considerable range are desirable, will depend on conditions of operation. In particular it will depend on such conditions as the time lag of the controlled process, and upon the frequency and the extent of the departure of the controling condition from its normal value, which may be expected to occur in normal operation as a result of load changes or other causes.

I have contemplated various other embodiments of my invention, one of which is disclosed in Fig. 7. In Fig. 7 the millivoltmeter type of measuring instrument previously described has been replaced with a self-balancing potentiometer diagrammatically illustrated, which may be of any suitable form such for example, as the self-balancing potentiometer disclosed in my prior Patent 2,058,585 issued October 27, 1936. As shown the potentiometer comprises a slide wire GA across the ends of which is impressed a voltage from a suitable source GA¹ and to one end of which is connected one terminal of a thermocouple T corresponding to the thermocouple T of Fig. 1. The opposite end of the thermocouple T is connected to one side of a galvanometer GA², the other side of which is connected to sliding contact GA³. Contact GA³ is in sliding engagement with slide wire GA and is driven longitudinally of the latter by means of a motor MC or by other suitable means under control of the galvanometer GA². I have not illustrated herein the specific means through which the galvanometer GA² controls the motor MC since various mechanical and electrical devices of this sort are well known in the art. It is significant for the purpose of the present invention to note that on a change in the temperature to which the thermocouple T is subjected, the potentiometer circuit will be unbalanced and in the device shown, thereby result in a deflection of the pointer of the galvanometer GA², which may by any suitable means control movement of the contact GA³ in a direction and to an extent to restore the balance in the potentiometer circuit, and consequently return the galvanometer pointer to its undeflected position. As is well known, the contact GA³ may be provided with an indicator or recorder member and may be adapted to cooperate with a suitable scale to indicate upon the latter the existing magnitude of the temperature at the thermocouple T.

For many control purposes it is sufficient to provide fuel valve controlling means or the like, the position of which corresponds with the magnitude of the condition being controlled and various devices for this purpose have previously been contemplated in combination with electrical drives for potentiometers as shown in Fig. 7, as well as with mechanical potentiometer drives, not shown. The terms "follow up," "proportioning," "throttling," and the like have been used to designate this type of control and such control would be obtained in the device of Fig. 7 if it did not include the special features of my invention hereinafter referred to. When considered without the latter, the control system includes a pilot motor MA connected in parallel with the motor MC and actuated with the latter so that the armature of each of the said motors is rotated proportionately and motor MA will thereby take a position corresponding to the position of the contact GA³. The motor MA may be readily adapted to control a fuel or like valve in generally the same manner as is the motor M of Fig. 1, but for purposes which will hereinafter be made clear, the motor MA of Fig.

7 is adapted to control in turn the actual fuel valve adjusting motor MB.

The means through which the motor MA controls the motor MB includes a lever MA¹ carried by the armature of the motor MA and connected to a contacting lever MA³, journalled coaxially with the armature of the motor MB, by means of link MA². The lever MA³ is in effect an electric contact arm which cooperates with a pair of contacts MB² and MB³ carried by a lever MB⁴ fixed to the armature of the motor MB and contacts MB² and MB³ are connected respectively to the fields MBF and MBR of the motor MB. The opposite ends of the fields MBF and MBR are connected together and to one side of the line over the conductor L¹ while the opposite side of the line L² is connected to the arm MA³.

In operation of the apparatus thus far described, a movement of the motor MA resulting from a deflection of the pointer of the galvanometer GA² will cause rotation of the lever MA³ to thereby disengage the latter from one of the contacts MB² or MB³ and motor MB in consequence will be energized for rotation in one direction or the other depending upon which of the contacts MB² or MB³ is left in engagement with the arm MA³. Rotation of the motor MB in either direction will result in rotation of the arm MB⁴ in a direction to effect re-engagement of the separated contact MB² or MB³ with lever MA³ and rotation of the motor MB will be terminated when both contacts MB² and MB³ are in engagement with the arm MA³, this by virtue of the equal and opposite turning tendencies of the fields MBF and MBR as they are simultaneously energized. The valve motor such as motor MB, as previously suggested, might well be directly connected to the motor MC and proportionately energized therewith. Since, however, the motor MC may ordinarily possess but little torque whereas a motor such as the motor MB serving the purpose of actuating a fuel valve is ordinarily more rugged and powerful, it has been found that more consistently proportionate movements of the rebalancing motor MC and the valve operating motor MB may be obtained if the latter is controlled by an additional motor such as the motor MA having characteristics like or more nearly approximating those of the contact driving motor.

As previously pointed out, the type of control obtained from the apparatus of Fig. 7 as thus far described, is insufficient for some purposes and I may obtain a more accurate control of a variable condition by the addition of means whereby the correspondence in position between the contact GA³ and the valve motor MB may be altered. As diagrammatically shown, these means include a pair of contacts MCH and MCL and a contact member 13B mechanically but not electrically connected to the contact GA³ and provisions responsive to the engagement of the contact 13B selectively with the contact MCH or MCL, to vary the speed of rotation of the motor MA with relation to the motor MC in much the same manner as the relative rotation of the motors MC and M of Fig. 1 is varied. The contacts MCH and MCL are arranged along the path of movement of the contact 13B and are arranged to be simultaneously contacted by the latter at a point in the travel of the contact GA³ corresponding to the normal value of the condition to be controlled which may be adjusted in any suitable manner as, for example, by sliding contacts MCH and MCL relative to contact 13B. The resistors HLA and HLB together with their respective controlling solenoids serve the same purpose as the correspondingly identified elements of Fig. 3A. On a departure of the condition above or below its normal value, the contact 13B will cause energization of one only of the solenoids 18A and 18B and in consequence, as will be clear from the description of Fig. 3A, one or the other of resistors HLA or HLB will be in circuit with its respective motor winding whenever the condition is other than its normal value. From the foregoing it will be clear that motors MA and MC will be simultaneously energized for proportionate rotation at all times but that the ratio of the movement of the motor MC to the movement of the motor MA as the condition is departing will be greater than the ratio of the movement of those motors when the condition is returning to its normal value, and in consequence the valve motor MB may occupy different positions for the same position of contact GA³.

In Figs. 8 and 9 I have illustrated still another form of my invention in which a condition responsive element such as the helix $g$ responsive to the temperature to which the bulb $t$ is exposed, is adapted to actuate a contact $g'$ along a resistor $g^2$ included in a self-balancing Wheatstone bridge circuit, two arms of which compose variable portions of the resistor $g^2$ and the remaining two arms compose variable portions of a secondary resistor $g^3$. A split solenoid $g^4$ is connected across the bridge circuit and is in inductive relation with and adapted to control an armature $g^5$ and the bridge circuit is energized from line conductors L'—L². A balancing conductor $g^6$ is connected to the contact $g'$, to the mid point of the split solenoid and to a second contact $g^7$, and the latter is adapted to be positioned by a valve motor MD which is under control of the armature $g^5$. The circuit over which the motor MD is controlled includes line conductor L' connected to contact $g^4$ which is rigidly connected to and positioned by the armature $g^5$ and a pair of contacts $g^9$ and $g^{10}$ connected respectively to reversing fields of the motor MD. Under conditions of bridge balance the opposed halves of solenoid $g^4$ exert equal effects upon armature $g^5$ and the latter is disposed in a mid position in which neither contact $g^9$ or $g^{10}$ is engaged by the contact $g^7$ and the motor MD is at that time stationary. As is well known, in such a bridge circuit an adjustment of contact $g^1$ in response to a temperature change, will vary the portion of resistor $g^2$ in the opposed bridge arms and thereby vary the relative current in respective halves of solenoid $g^4$ resulting in movement of armature $g^5$ from its mid position in a direction depending upon the direction of movement of contact $g^1$ from a predetermined position. On a deflection of the armature $g^5$ in one direction or the other in response to bridge unbalance on a temperature change, motor MD will thereby be energized in a direction to simultaneously adjust a fuel valve $g^{11}$ or the like in a direction to restore the condition to normal and to adjust the contact $g^7$ in a direction tending to restore the bridge balance.

In the system of Fig. 8, if the motor MD were rigidly connected to the contact $g^7$ the fuel valve $g^{11}$ would occupy a position corresponding at all times to the position of the contact $g^1$, but for purposes previously described, it is sometimes desirable to displace the relation of the condition responsive means and the fuel valve for load compensation purposes or in other words to permit contact $g^1$ to occupy a predetermined normal position corresponding to the desired value of the condition with valve $g^{11}$ in any position necessary to maintain that value. I attain this end by arranging the actuating connection between the balancing contactor $g^7$ and the motor MD such that when the value of the controlled condition is displaced from normal, any movement of the valve MD in response to a departure of the condition will result in a greater ratio of valve movement to balancing contactor movement than the ratio of valve movement to balancing contactor movement when the balancing motor is actuated in response to a return of the condition to its normal value.

The means for obtaining variation in the ratio of movement of the motor MD to the movement of the contact $g^7$ includes a gear shift arrangement shown in detail in Fig. 9 having a shaft $MD^1$ fixed to the armature of motor MD and carrying gears $MD^2$ and $MD^3$ fixed thereto. Gear $MD^2$ is in mesh with a slidable gear $MD^4$ in the condition of the apparatus shown in Fig. 9, in which a solenoid $MD^6$ is energized attracting gear $MD^4$ to and retaining it in the position shown against a suitable stop. Gear $MD^3$ is adapted to mesh with another slidable gear $MD^5$ in an alternative condition of the apparatus in which a solenoid $MD^7$ is energized attracting the latter. Gears $MD^4$ and $MD^5$ are fixed together and are angularly fixed to but slidable longitudinally of a shaft $MD^8$ and the latter is adapted in any suitable manner to drive the contactor $G^7$. As shown, the gear ratios are such that a greater movement of motor MD before the bridge balance is effected, will be permitted with gears $MD^2$, $MD^4$ in mesh than will be permitted with gears $MD^3$, $MD^5$ in mesh.

The selective control means for energizing solenoids $MD^6$ and $MD^7$ at the proper time to cause gears $MD^2$ and $MD^4$ to be in mesh on a departing condition and to cause gears $MD^3$ and $MD^5$ to be in mesh on a returning condition includes two switches S and T. Switch S is of the friction variety having a lever $S^1$ pivoted at $S^2$ and provided at one end with a friction pad $S^3$ engaging gear $MD^3$. The opposite end of lever $S^1$ is adapted to engage one of a pair of contacts $S^4$, $S^5$ which are separated by a short space just sufficient to permit individual selection by lever $S'$. Contacts $S^4$ and $S^5$ are connected selectively to solenoids $MD^6$ and $MD^7$ through switch T. Switch T is in effect a reversing switch including switch blade $T'$ which occupies its full line position of Fig. 9 by virtue of the bias of spring $T^3$, and a switch blade $T^4$ which occupies the position of Fig. 9, under the bias of a spring $T^6$. In this position contact $S^5$ is in circuit with solenoid $MD^6$ and contact $S^4$ is in circuit with solenoid $MD^7$. Energization of solenoids $T^2$ and $T^5$ will result in movement to the dotted positions shown in Fig. 9, of blades $T'$ and $T^4$ in which positions the relation of contacts $S^4$, $S^5$ and solenoids $MD^6$ and $MD^7$ will be reversed so that contact $S^4$ is connected to solenoid $MD^6$ and contact $S^5$ is connected to solenoid $MD^7$.

Solenoids $T^2$ and $T^5$ are controlled in accordance with the value of the condition as, for example, by means of a contact arm $T^7$ actuated by the element $g$. Arm $T^7$ is connected to line $L^2$ and is arranged to cooperate with a contact $T^8$ connected to the solenoids $T^2$ and $T^5$ over conductor $T^9$. The opposite sides of the solenoids $T^2$ and $T^5$ are connected together and to line $L'$ so that upon engagement of arm $T^7$ and contact $T^8$ solenoids $T^2$ and $T^5$ are energized. Contact $T^8$ is adapted to be adjusted longitudinally of the resistor $g^2$ to a position corresponding to the temperature that is to be maintained. Thus the gear shifting solenoids $MD^6$ and $MD^7$ will be selectively energized depending jointly upon the positions of switches S and T and the positions of the latter depend upon whether the value of the condition is approaching or is departing from its desired value.

In operation, the motor MD is energized by engagement of contact $g^8$ with either of contacts $g^9$ and $g^{10}$ in consequence of a movement of contact $g'$ on a condition change and a movement will be imparted to valve $g''$ in a direction to reverse the condition change which caused the movement of contact $g^1$. The extent of valve movement will depend upon the extent of movement simultaneously given to the balancing contact $g^7$ as the latter is driven by motor MD, and the ratio of the movement of motor MD to the movement of contact $g^7$ will depend upon which gear $MD^2$ or $MD^3$ is then operative. Through operation of switch S, any reversal in direction of motor MD will automatically throw out of operation the gear $MD^2$ or $MD^3$ then operative and throw into operation the other gear $MD^3$ or $MD^2$.

On a rise in temperature at the bulb $t$, tube $g$ will unwind raising contact $g^1$ along resistor $g^2$ and unbalancing the bridge circuit. Such unbalance will result in a rise in the current value in the lower half of coil $g^4$ over the current in the upper half thereof and armature $g^5$ will be drawn downward effecting engagement of contact $g^8$ with contact $g^9$. Motor MD thus energized will adjust valve $g^{11}$ in a direction to reduce the fuel supply and simultaneously move contact $g^7$ downward, the motor MD coming to rest when contact $g^7$ has moved along resistor $g^3$ a distance corresponding to the opposed movement of contact $g^1$ whereupon the current in the upper and lower halves of coil $g^4$ respectively will be equal and contact $g^8$ will be moved out of engagement with contact $g^9$.

As will be clear the movement of tube $g$ on a temperature rise will also cause disengagement of contact $T^7$ with contact $T^8$ and in consequence the switches S and T will be as indicated in Fig. 9 and contact $g^7$ will be moved through gear $MD^2$ until the system is balanced. As diagrammatically indicated in Fig. 8 the dotted line X may represent the position of valve $g^{11}$ just prior to the above mentioned temperature rise and the dotted line Y may represent the valve position after said temperature rise and after the bridge is rebalanced by movement of contact $g^7$ when the latter and contact $g^1$ may occupy their dotted positions of Fig. 8. With contact $g^1$ in this dotted position, a decrease in temperature will result in its movement toward the full line position raising armature $g^5$ and bringing contact $g^8$ into engagement with contact $g^{10}$. The ensuing rotation of motor MD, in the opposite direction from its rotation previously described, will first cause switch lever $S^1$ of switch S to tilt out of engagement with contact $S^5$ and into engagement with contact $S^4$. Solenoid $MD^7$ will thereupon become energized and solenoid $MD^6$ de-energized shifting gear $MD^4$ out of mesh with gear $MD^2$ and shifting gear $MD^5$ into mesh with gear $MD^3$. The contact $g^7$ will be thus driven by continued rotation of motor MD, through the transmission connection including gears MD³ and MD⁵ and by virtue of the difference in the ratio of the last mentioned gears and the ratio of gears MD² and MD⁴ contact g⁷ will be driven further for a given motor movement than is the case when the latter gears are operative. Assuming that the temperature now returns to its normal value, the contact g¹ will be returned to the full line position of Fig. 8 but valve g¹¹ will not be returned to the position indicated by the line X but will be returned to a position intermediate the latter and the position indicated by line Y and the final position may be represented by the line Z. The difference between the position Z and the position X is calculated to compensate for a load condition change which would produce the change in valve position from its position X to its position Y and is proportional to the latter change. The ratio of the angular displacement of line Y from the line X to the angular displacement of the line Z from the line X will depend on the ratio of the respective gear ratios of pairs of gears MD², MD⁴ and MD³, MD⁴ which is adjustable as for example, by replacing either pairs of gears with a pair of different ratio.

If the temperature should subsequently fall below normal, contact G¹ will move downward, and contact T⁷ will be brought into engagement with contact T⁸, thereby energizing solenoids T² and T⁶, reversing the connections between switch S and solenoids MD⁷ and MD⁸. On a sustained movement of the contact G¹, for example, from a position in which contact T⁷ is out of engagement with the contact T⁸ to a position in which the latter engage, and with the accompanying rotation of the motor MD in a direction to energize solenoid MD⁷ through contact S⁴ of the switch S, switch T will be actuated as contacts T⁷ and T⁸ are made to disconnect contact S⁴ from solenoid MD⁷ and connect it to solenoid MD⁶, thereby shifting gears MD³ and MD⁵ out of action and meshing gears MD² and MD⁴. The drive for contact G⁷ will thus be changed from a higher speed to a lower speed. Thereafter when the motor MD is reversed on a rise toward normal of the condition, switch S will reverse the solenoid connections disengaging gears MD² and MD⁴, and meshing gears MD³ and MD⁵ for higher speed operation of contact G⁷. The last described action is the converse of the operation first described in connection with the dotted positions X, Y and Z of Fig. 8 so that if, following a rise from and a fall to normal of the temperature leaving valve G¹¹ in the position represented by the line Z, a fall in temperature of equal magnitude and subsequent return thereof to normal will restore the valve to the position of line X.

As is made apparent by the arrangements previously described herein, by way of example, the present invention is adapted for effective use in various forms and under a wide range of operating conditions, and is advantageously characterized, not only by its adaptability for use under different conditions, but also by the inherent relative simplicity and reliability of the means by which follow-up and compensating adjustment are obtained and related by the use of simple reversible follow-up and control motors. As will be understood, certain features of the invention may be used to advantage in certain cases without a corresponding use of other features.

Having now described my invention, what I claim as new and desire to secure by Letters Patent is:

1. The combination with a reversible electric control motor, of mechanism controlling said motor, comprising a member deflecting in accordance with changes in a controlling condition, a reversible electric follow-up motor, a control device adjusted along the path of deflection of said element by the operation of said follow-up motor and selectively cooperating with said element, as the latter deflects toward and away from a normal position thereof, to energize said control motor for operation in the direction tending to reverse the direction of element deflection and to energize said follow-up motor for operation in the direction to adjust said device in the direction of deflection of said element, and means for making the ratio of control motor movement to follow-up motor movement greater when said element is deflecting away from, than when it is deflecting toward said normal position.

2. The combination with a reversible electric control motor, of mechanism controlling said motor, comprising an element deflecting in accordance with changes in a controlling condition, a control table, a reversible electric follow-up motor for adjusting said table along the path of deflection of said element, control means carried by said table and selectively cooperating with said element, as the latter deflects toward and away from a normal position thereof to energize said control motor for operation in the direction tending to reverse the direction of element deflection and to energize said follow-up motor for operation in the direction to adjust said table in the direction of deflection of said element, and means for making the ratio of control motor movement to follow-up motor movement greater on an element deflection away from said normal position than on a deflection of the same magnitude toward said normal position.

3. Apparatus for controlling a variable quantity comprising a reversible electric control motor producing control effects tending to increase or decrease said quantity accordingly as the motor operates in one direction or in the opposite direction, a member deflecting in accordance with the variations in said quantity, means cooperating with said member to establish one circuit energizing said motor for operation in said one direction on a decrease in said quantity and to establish a second circuit energizing said motor for operation in said opposite direction on an increase in said quantity, and means cooperating with said member to increase or decrease the motor operating effect of said one circuit relative to that of the said second circuit accordingly as the value of said quantity is below or above a predetermined value.

4. Apparatus for controlling a variable quantity comprising a reversible electric control motor producing control effects tending to increase or decrease said quantity accordingly as the motor operate in one direction or in the opposite direction, a member deflecting in accordance with the variations in said quantity, means cooperating with said member to establish one circuit energizing said motor for operation in said one direction on a decrease in said quantity and to establish a second circuit energizing said motor for operation in said opposite direction on an increase in said quantity, and means cooperating with said member to include resistance in said one circuit or in said second circuit and thereby diminish the motor operating effect of the circuit, accordingly as the value of said quantity is above or below a predetermined value.

5. In control apparatus, the combination of a deflecting member, of a cooperating control table, means including a rotatable shaft for giving follow-up adjustments to said table, a reversible electric control motor, means cooperating with said member and table to energize said motor to effect corrective control effects on the deflection of said member in either direction, and a switch mechanism controlled by said shaft for minimizing the corrective effects of the control motor as a result of the deflection of said member away from a normal position thereof, relative to the corrective effects of the control motor on the deflection of the member away from its said normal position.

6. In control apparatus, the combination with a member deflecting in accordance with variations in a variable quantity, of a control table, means for giving said table follow-up adjustments, a reversible electric control motor, means cooperating with said member and table to establish an energizing circuit for operation of the control motor in the direction to increase the quantity on a decrease in the latter and for establishing a second energizing circuit for operation of the control motor in the direction to decrease said quantity on an increase in the latter, and means actuated by the first mentioned means when the latter adjusts said table to the high or low side, respectively, of an intermediate position thereof to respectively increase or decrease the resistance into said one circuit relative to the resistance in said second circuit.

7. In control apparatus, the combination of a deflecting member, of a cooperating control table, means including a rotatable shaft for giving follow-up adjustments to said table, a reversible electric control motor, means cooperating with said member and table to energize said motor to effect corrective control effects on the deflection of said member in either direction, a part rotated by the rotation of said shaft, and mercury switch means carried by said part, and actuated by the rotation of shaft to minimize the corrective effects of the control motor as a result of the deflection of said member away from a normal position thereof, relative to the corrective effects of the control motor on the deflection of the member away from its said normal position.

8. In control apparatus, the combination with a member deflecting in accordance with the variations in a variable quantity, of a control table, means for giving said table follow-up adjustments, a reversible electrical control motor, means cooperating with said member and table to establish an energizing circuit for operation of the control motor in the direction to increase said quantity on a decrease in the latter and for establishing a second energizing circuit for operation of the control motor in the direction to decrease said quantity on an increase in the latter, and switching means associated with said circuits and actuated by the first mentioned means for switching resistance into and out of said one circuit as said quantity increases above and diminishes to a predetermined value thereof and for switching resistance into and out of said second circuit as said quantity decreases below and increases to a predetermined value thereof.

9. In control apparatus, the combination with a member deflecting in accordance with the variations in a variable quantity, of a control table, means for giving said table follow-up adjustments, a reversible electrical control motor, means cooperating with said member and table to establish an energizing circuit for operation of the control motor in the direction to increase said quantity on a decrease in the latter and for establishing a second energizing circuit for operation of the control motor in the direction to decrease said quantity on an increase in the latter, and switching means associated with said circuits and actuated by the first mentioned means for switching resistance into and out of said one circuit as said quantity increases above and diminishes to a predetermined value and for switching resistance into and out of said second circuit as said quantity decreases below and increases to a second predetermined value thereof, lower than the first mentioned value.

10. In control apparatus, the combination with a member deflecting in accordance with the variations in a variable quantity, of a control table, means for giving said table follow-up adjustments, a reversible electrical control motor, means cooperating with said member and table to establish an energizing circuit for operation of the control motor in the direction to increase said quantity on a decrease in the latter and for establishing a second energizing circuit for operation of the control motor in the direction to decrease said quantity on an increase in the latter, and switching means associated with said circuits and actuated by the first mentioned means for switching resistance into and out of said one circuit as said quantity increases above and diminishes to a predetermined value and for switching resistance into and out of said second circuit as said quantity decreases below and increases to a second predetermined value thereof, lower than the first mentioned value, said switching means being adjustable to vary the difference between said predetermined values.

11. In control apparatus, the combination with a member deflecting in accordance with the variations in a variable quantity, of a control table, means for giving said table follow-up adjustments, a reversible electrical control motor, means cooperating with said member and table to establish an energizing circuit for operation of the control motor in the direction to increase said quantity on a decrease in the latter and for establishing a second energizing circuit for operation of the control motor in the direction to decrease said quantity on an increase in the latter, and switching means associated with said circuits and actuated by the first mentioned means for switching resistance into and out of said second circuit as said quantity decreases below and increases to a predetermined value thereof, said switching means being adjustable relative to the first mentioned means to thereby vary the value of said quantity which the apparatus tends to maintain.

12. The combination with controlling means comprising a member adapted to deflect in accordance with changes in a variable quantity and a cooperating adjustable control table, of a reversible electric follow-up motor adapted to give follow-up adjustments to said table, a reversible electric control motor, motor energizing means, selectively controlled by said controlling means in accordance with the relative positions of said member and table, and adapted to energize each of said motors for operation in one direction or in the opposite direction, depending upon the relative position of said table and member, and means controlled by said controlling means for increasing or decreasing the ratio of the operative effect of the control motor relative to that of the follow-up motor accordingly as said quantity is varying toward or away from a predetermined value of said quantity.

13. The combination with controlling means comprising a member adapted to deflect in accordance with changes in a variable quantity and a cooperating adjustable control table, of a reversible electric follow-up motor adapted to give follow-up adjustments to said table, a reversible electric control motor, motor energizing means controlled by said controlling means and including contacts selectively adjusted by said controlling means in accordance with the relative positions of said member and table, and adapted to energize each of said motors for operation in one direction or in the opposite direction, depending upon the selective adjustment of said contacts, and means controlled by said controlling means for increasing or decreasing the ratio of the operative effect of the control motor relative to that of the follow-up motor accordingly as said quantity is varying toward or away from a predetermined value of said quantity.

14. The combination with controlling means comprising a member adapted to deflect in accordance wtih changes in a variable quantity and a cooperating adjustable control table, of a reversible electric follow-up motor adapted to give follow-up adjustments to said table, a reversible electric control motor, motor energizing means controlled by said controlling means and including contacts selectively adjusted by said controlling means in accordance with the relative positions of said member and table, and adapted when actuated to energize each of said motors for operation in one direction or in the opposite direction, depending upon the selective adjustment of said contacts, means for periodically actuating said energizing means, and means controlled by said controlling means for increasig or decreasing the ratio of the operative effect of the control motor relative to that of the follow-up motor accordingly as said quantity is varying toward or away from a predetermined value of said quantity.

15. Apparatus for controlling a variable quantity, comprising in combination, means responsive to variations in said quantity, a reversible electric control motor adapted to produce control effects tending to increase or decrease said quantity accordingly as said motor is operated in one direction or in the opposite direction, motor energizing means controlled by the first mentioned means to establish one circuit energizing said motor for operation in said one direction on a decrease in said quantity, and to establish a second circuit energizing said motor for operation in said opposite direction on an increase in said quantity, and compensating means controlled by the first mentioned means for increasing or decreasing the ratio of the control effect produced by said motor when operated in said one direction relative to the control effect produced by the motor when operated in said opposite direction, accordingly as the value of said quantity exceeds or is less than a predetermined value thereof.

16. Apparatus for controlling a variable quantity comprising a reversible electric control motor producing control effects tending to increase or decrease said quantity accordingly as the motor operates in one direction or in the opposite direction, an electrical network adapted to be balanced under predetermined conditions, means responsive to a variable condition for unbalancing said network, a device responsive to said unbalance for selectively controlling said motor in accordance with the direction and extent of said unbalance, means controlled by said motor for rebalancing said network and means for varying the ratio of said control effect and said rebalancing operation selectively in accordance with the departure from or return to normal of the variable condition.

17. Apparatus for controlling a variable quantity comprising first and second reversible electric control motors, means controlled by one of said motors for producing control effects tending to increase or decrease said quantity accordingly as the motor operates in one direction or in the opposite direction, an electrical network adapted to be balanced under predetermined conditions, means responsive to a variable condition for unbalancing said network, a device responsive to said unbalance for selectively controlling said motors in accordance with the direction and extent of said unbalance, means controlled by the second said motor for rebalancing said network and means for controlling the ratio of the movements of said motors respectively, selectively in accordance with the departure from or return to normal of the variable condition.

18. Apparatus for controlling a variable quantity comprising first, second and third reversible electric control motors, the first and second said motors being of substantially the same characteristics, means controlled by one of said motors for producing control effects tending to increase or decrease said quantity accordingly as the motor operates in one direction or in the opposite direction, an electrical network adapted to be balanced under predetermined conditions, means responsive to a variable condition for unbalancing said network, a device responsive to said unbalance for selectively controlling said first and second motors in accordance with the direction and extent of said unbalance, means controlled by one of said motors for rebalancing said network, means responsive to the second said motor for controlling the third said motor, and means for controlling the ratio of the movements of said first and second motors respectively, selectively in accordance with the departure from or return to normal of the variable condition.

19. Electrical control apparatus including a self balancing system including means responsive to a variable condition for unbalancing said system, means operated in response to said unbalance to restore said balance, a device operated proportionally with the second mentioned means for controlling said variable condition, and means for changing said proportionality accordingly as said variable condition is departing from or returning to a predetermined value.

20. A proportioning control system including an electrical bridge circuit having first and second impedances, and a device responsive to bridge unbalance, means operating the first said impedance in response to a variable condition for unbalancing said bridge, a motor controlled by said device for controlling said condition and proportionally operating the second said impedance and means responsive to a departure from normal of said condition for varying said proportionality accordingly as said condition is departing from or returning to said normal.

21. Control apparatus including a self balancing potentiometer system having means for producing an E. M. F. responsive to the value of a variable condition, means producing an E. M. F. for opposing the first mentioned E. M. F., a device responsive to potentiometer unbalance for controlling the second mentioned E. M. F. to rebalance said system, a motor controlled by said device for controlling said condition proportionally with the rebalancing operation and means responsive to said condition to vary the proportionality of rebalancing action to motor movement accordingly as said condition is departing from or returning to said normal condition.

22. Control apparatus including a self balancing potentiometer system having means for producing an E. M. F. responsive to the value of a variable condition, means producing an E. M. F. for opposing the first mentioned E. M. F., a device responsive to potentiometer unbalance for controlling the second mentioned E. M. F. to rebalance said system, a motor controlled by said device for controlling said condition proportionally with the rebalancing operation and means responsive to the value of said condition and to the direction of movement of said motor for making the ratio of rebalancing action to motor movement greater when said condition is returning to normal than when departing from normal.

23. Control apparatus including a self-balancing potentiometer system having means for producing an E. M. F. responsive to the value of the variable condition, means for producing an E. M. F. opposing the first mentioned E. M. F., a reversible electrical motor adapted to respond to potentiometer unbalance to control the second mentioned E. M. F. and thereby rebalance said system, a second reversible electrical motor adapted to produce control effects affecting said condition, means to energize the second mentioned motor proportionately with the first mentioned motor, and means responsive to the value of said condition with respect to a normal value thereof to independently affect the control of the second mentioned motor.

24. In an electrical control system, a reversible electrical control motor, means responsive to the value of a condition to be controlled, means actuated in response to a change in said condition for energizing said motor, and means operable to reverse the direction of rotation of the said motor and adapted to vary the speed of said motor on each such reversal.

25. In an electrical control system, a reversible electrical control motor, means responsive to the value of a condition to be controlled, means actuated in response to a change in said condition for energizing said motor, means operable to reverse the direction of rotation of the said motor and adapted to vary the speed of said motor on each such reversal, and means adapted to vary the effect of the third mentioned means accordingly as the value of said condition is above or below a predetermined value.

26. In an electrical control system, a reversible electrical control motor, means responsive to the value of a condition to be controlled, means actuated in response to a change in said condition for energizing said motor, means operable to reverse the direction of rotation of the said motor and adapted to vary the speed of said motor on each such reversal, and means adapted to vary the effect of the third mentioned means accordingly as the value of said condition is above or below a predetermined value, the last said means including a device having only two conditions of operation.

27. In control apparatus, the combination of means responsive to a variable condition, a rotatable shaft, a reversible electric control motor, control means actuated by the first mentioned means in response to a change in said condition to energize said motor to effect corrective control effects on such condition change, means responsive to a departure of said condition from a normal value thereof and adapted to rotate said shaft in one direction or the other dependent upon the direction of the departure of said condition, mercury switch means controlled by said shaft, and independent electrical means, including said mercury switch means, adapted to vary the energizing effect of said motor by said control means in response to an off normal condition.

28. The method of controlling a variable measurable physical condition which includes the steps of effecting a corrective control action of a magnitude varying in fixed proportion to the change in condition on a departure of the latter from a normal value thereof, effecting a corrective control action in the opposite sense and of a magnitude varying in a fixed proportion to the change in said condition, which is different from the first mentioned proportion on a return of said condition toward its normal value, and continuously effecting said corrective control actions in opposite senses in alternation and in the said proportions so long as the value of the condition is different from said normal value.

THOMAS R. HARRISON.